(12) United States Patent
Hatakeyama et al.

(10) Patent No.: US 6,508,554 B2
(45) Date of Patent: Jan. 21, 2003

(54) PROJECTION-TYPE IMAGE DISPLAY APPARATUS

(75) Inventors: Atsushi Hatakeyama, Osaka (JP); Shigekazu Yamagishi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 41 days.

(21) Appl. No.: 09/866,175

(22) Filed: May 25, 2001

(65) Prior Publication Data

US 2002/0008196 A1 Jan. 24, 2002

(30) Foreign Application Priority Data

Jun. 12, 2000 (JP) ........................................ 2000-175417

(51) Int. Cl.[7] .................. G03B 21/00; G03B 21/26; G02B 26/08
(52) U.S. Cl. ....................... 353/31; 353/34; 353/37; 359/201; 359/204; 359/212; 359/216; 359/223
(58) Field of Search .............................. 353/31, 34, 37, 353/7, 8, 9; 359/464, 462, 201, 204, 209, 212, 216, 211, 223; 349/7, 8, 5, 15; 348/744, 51, 55, 56, 54

(56) References Cited

U.S. PATENT DOCUMENTS

| | | | | |
|---|---|---|---|---|
| 5,845,981 A | * | 12/1998 | Bradley | ......................... 353/31 |
| 5,929,979 A | | 7/1999 | Okino et al. | .................. 355/60 |
| 6,169,562 B1 | * | 1/2001 | Morimoto | ...................... 347/232 |
| 6,170,953 B1 | | 1/2001 | Lee et al. | ....................... 353/82 |
| 6,175,440 B1 | | 1/2001 | Conemac | ...................... 359/204 |
| 6,433,930 B1 | * | 8/2002 | Son | ............................. 359/464 |
| 2001/0038484 A1 | * | 11/2001 | Harada | ........................ 359/204 |

FOREIGN PATENT DOCUMENTS

| | | | |
|---|---|---|---|
| EP | 492 721 A2 A3 | 7/1992 | ............. H04N/9/31 |
| JP | 4-316296 | 11/1992 | ............. H04N/9/31 |
| JP | 6-148635 | 5/1994 | ......... G02F/1/1335 |
| JP | 7-318939 | 12/1995 | ......... G02F/1/1335 |
| JP | 9-512648 | 12/1997 | ........... G02B/27/18 |
| JP | 10-142548 | 5/1998 | |
| JP | 11-24164 | 1/1999 | ........... G03B/21/00 |
| JP | 2000-28960 | 1/2000 | ........... G02B/27/18 |
| JP | 2000-207750 | 7/2000 | ........... G11B/7/085 |
| WO | WO 96/03842 | 2/1996 | ............. H04N/9/31 |

* cited by examiner

Primary Examiner—Russell Adams
Assistant Examiner—Melissa J Koval
(74) Attorney, Agent, or Firm—Merchant & Gould, P.C.

(57) ABSTRACT

Red, green and blue light beams from, a light source portion travel via a first optical system and enter a reflecting surface of a rotating polygon mirror at different angles so as not to overlap each other. The rotating polygon mirror makes these light beams perform scanning when reflecting these light beams. The light beams for the scanning enter a second optical system at different angles and are led to different positions on an image display panel. The second optical system forms an image that is rotated by 90° from that on the rotating polygon mirror on the image display panel. On the image display panel, belt-like regions illuminated by the light beams of individual colors are formed in parallel with each other, and these illuminated regions are moved continuously by the scanning. Each pixel of the image display panel is driven by a signal corresponding to a color of light entering this pixel. A formed color image is magnified and projected by a projection optical system. With such a projection-type image display apparatus, it becomes possible to achieve a display with a high efficiency of light utilization and a high resolution. In addition, since the second optical. system rotates the light beams from the rotating polygon mirror by 90° and then leads them to the image display panel, a widely-used image display panel can be used. Accordingly, an image display apparatus that is small, thin and inexpensive can be achieved.

7 Claims, 10 Drawing Sheets

PROJECTION-TYPE IMAGE DISPLAY APPARATUS

BACKGROUND OF THE INVENTION

1. Field of the Invention

The present invention relates to a projection-type image display apparatus that displays a color image with one light valve as a light modulating member.

2. Description of Related Art

A liquid crystal projector now part of the mainstream in the market of large-screen displays uses a light source lamp, a focusing lens and a projection lens to magnify and form an image of a liquid crystal panel (a light valve) onto a screen. Currently commercialized systems can be classified roughly into a three-plate system and a single-plate system.

In the former system of the three-plate liquid crystal projector, after a light beam from a white light source is separated into light beams of three primary colors of red, green and blue by a color separation optical system, these light beams are modulated by three monochrome liquid crystal panels so as to form images of the three primary colors. Thereafter, these images are combined by a color combination optical system so as to be projected onto a screen by one projection lens. Since the entire spectrum of the white light from the light source can be utilized, this system has a high efficiency of light utilization. However, because of the necessity of the three liquid crystal panels, the color separation optical system, the color combination optical system and a convergence adjusting mechanism between the liquid crystal panels, this system is relatively expensive.

On the other hand, a conventional single-plate system liquid crystal projector is compact and inexpensive because an image formed on a liquid crystal panel having a mosaic color filter simply is magnified and projected onto a screen. However, since this system obtains light with a desired color by absorbing light with a unwanted color out of white light from the light source by means of the color filter as a color selection member, only one-third or less of the white light that has entered the liquid crystal panel is transmitted (or reflected). Accordingly, the efficiency of light utilization is low and high-brightness images cannot be obtained easily. When the light source is brightened, the brightness of the displayed image can be improved. However, there remain problems of heat generation and light resistance owing to light absorption by the color filter, making it very difficult to increase the brightness.

In recent years, as a way to eliminate light loss owing to the color filter in this single-plate system, a new configuration in which the efficiency of light utilization is raised by using dichroic mirrors and a microlens array instead of the color filter has been suggested and also commercialized.

A conventional single-plate projection-type image display apparatus, which improves the efficiency of light utilization using the dichroic mirrors and the microlens array, will now be described. FIG. 7 shows a schematic configuration thereof, and FIG. 8 shows a detailed cross-section of a light valve of the projection-type image display apparatus shown in FIG. 7.

A projection-type image display apparatus 900 has a light source portion 901, an illuminating device 903, a color separation optical system 907, a transmission-type light valve 902 and a projection lens 908. A white light beam from the light source portion 901 irradiates an effective region of the light valve 902 by means of the illuminating device 903.

The color separation optical system 907 includes a red-reflecting dichroic mirror 904, a green-reflecting dichroic mirror 905 and a total reflection mirror 906 that are arranged obliquely. The white light beam that has passed through the illuminating device 903 enters the color separation optical system 907, thereby being separated horizontally into three light beams of primary colors of red, green and blue, so as to enter the light valve 902. The transmission-type light valve 902 has pixels that can modulate the incident light beams of the respective colors independently by an input signal corresponding to each of the red, green and blue light beams. These pixels are arranged horizontally in one element.

The white light beam emitted from the light source portion 901 is led to the color separation optical system 907 by the illuminating device 903. A red light beam in the incident light is reflected by the red-reflecting dichroic mirror 904 placed obliquely with respect to the incident light so as to travel along an optical axis 909. A green light beam in the light transmitted by the red-reflecting dichroic mirror 904 is reflected by the green-reflecting dichroic mirror 905 placed obliquely with respect to the incident light so as to travel along an optical axis 910. A blue light beam transmitted by the green-reflecting dichroic mirror 905 enters the reflection mirror 906, and is then reflected so as to travel along an optical axis 911. The red light beam on the optical axis 909, the green light beam on the optical axis 910 and the blue light beam on the optical axis 911 pass through a condenser lens 912 and reach the transmission-type light valve 902.

As shown in FIG. 8, an entrance-side polarizing plate 913 as a polarizer is provided on the side of an entrance surface of the transmission-type light valve 902, and only the light beam having a predetermined polarization direction in the incident light is transmitted by this polarizing plate 913. The transmitted light enters a microlens array 918 including a group of microlenses 917 with their longitudinal direction being in a vertical direction. The horizontal width of the microlens 917 corresponds to the total horizontal widths of a pixel aperture for red 914, a pixel aperture for green 915 and a pixel aperture for blue 916. The red light beam that has traveled along the optical axis 909 and entered the microlens 917 obliquely at an incident angle of $\theta 1$ is focused on the pixel aperture for red 914. The green light beam that has traveled along the optical axis 910 and whose chief ray entered the microlens 917 at a right angle is focused on the pixel aperture for green 915. The blue light beam that has traveled along the optical axis 911 and entered the microlens 917 obliquely from the direction opposite to the red light at an incident angle of $\theta 1$ is focused on the pixel aperture for blue 916.

The light beam of each color that has passed through the pixel aperture for each color enters an exit-side polarizing plate 919 provided on an exit surface of the transmission-type light valve 902. The exit-side polarizing plate 919 has a polarization axis arranged orthogonal to the polarization axis of the entrance-side polarizing plate 913. Since a light beam that has entered a pixel aperture to be displayed as white is emitted with its polarization direction being rotated by about 90° in a liquid crystal layer, it is transmitted by the exit-side polarizing plate 919 and reaches the projection lens 908. Since a light beam that has entered a pixel aperture to be displayed as black is emitted without being subjected to the rotation of its polarization direction in the liquid crystal layer, it is absorbed by the exit-side polarizing plate 919 and does not reach the projection lens 908. The transmission-type light valve 902 rotates the polarization direction of the incident light at every pixel so as to display an image.

In the single-plate projection-type image display apparatus with the new configuration in which the efficiency of light utilization is raised as described above, it is possible to achieve a high efficiency of light utilization close to that in the three-plate system without wasting the light from the light source.

However, in this configuration, a bright lens whose f-number is smaller than $1/(2 \sin (\theta_2+\theta_3))$ is required as the projection lens 908, where a half-angle of a cone of rays converging from the microlens 917 toward the pixel aperture is expressed by $\theta_2$ and an incident angle at which the chief ray of the red light or the blue light enters the pixel aperture is expressed by $\theta_3$. An actual f-number is 1.0 to 1.5.

Accordingly, even when the single-plate system is adopted so as to use one display device, the size and the cost of the projection lens increase in practice. Thus, its advantage over the three-plate system is not readily apparent.

Furthermore, since a light beam of each color from the light source is led to the pixel of a corresponding color, the resolution of an image display panel (the transmission-type light valve 902) has to be three times as high as a necessary resolution in order to achieve high resolution. This increases the cost of the image display panel, and also lowers transmittance when the transmission-type light valve is used as the image display panel. Moreover, when the resolution of the image display panel is low, or when an image is magnified considerably, colors of red, green and blue look separate, causing image quality deterioration such as convergence dislocation.

In response to the above problems, an image display apparatus is suggested in JP 4(1992)-316296 A. FIG. 9 shows a schematic configuration of this image display apparatus.

A white light beam emitted from a light source portion 920 is led to a color separation optical system 921. As shown in FIG. 10, the color separation optical system 921 includes dichroic mirrors 921a and 921b and two reflection mirrors 921c and 921d. The dichroic mirror 921a reflects blue light and transmits green light and red light. The dichroic mirror 921b reflects red light and transmits green light and blue light. These dichroic mirrors 921a and 921b are crossed. A blue light beam 932 out of a white light beam 931 from the light source portion 920 is reflected by the dichroic mirror 921a, reflected by the reflection mirror 921d and passes through an aperture 922b of a field stop 922. A red light beam 933 is reflected by the dichroic mirror 921b, reflected by the reflection mirror 921c and passes through an aperture 922r of the field stop 922. A green light beam 934 is transmitted by both the dichroic mirrors 921a and 921b and passes through an aperture 922g of the field stop 922. The apertures 922r, 922g and 922b of the field stop 922 are formed like a belt (a rectangle), and the light beams of red, green and blue are emitted adjacent to each other from these apertures.

The belt-like light beams of respective colors emitted from the field aperture 922 pass through a scanning optical system 924, then illuminate different regions of a single transmission-type light valve (a display panel) 923 in a belt-like manner. With an effect of a rotating prism 924a constituting the scanning optical system 924, the belt-like light beams of red, green and blue scan the light valve 923 from the bottom to the top. When a belt-like illuminated region of one of the light beams goes beyond the uppermost end of an effective region of the light valve 923, the belt-like illuminated region of this light beam appears at the lowermost end of the effective region of the light valve 923 again.

In this manner, the light beams of red, green and blue can continuously scan over the entire effective region of the light valve 923.

A light beam illuminating each row on the light valve 923 varies moment by moment, and a light valve driving device (not shown in this figure) drives each pixel by an information signal according to the color of the light beam that is illuminated. This means that each row of the light valve 923 is driven three times at every field of a video signal to be displayed. A driving signal inputted to each row is a color signal corresponding to the light beam illuminating this row among signals of the image to be displayed. The light beams of these colors that have been modulated by the light valve 923 are magnified and projected onto a screen (not shown in this figure) by a projection lens 925.

With the above configuration, the light beam from the white light source is separated into light beams of three primary colors, so that the light from the light source can be used with substantially no loss and the efficiency of light utilization can be increased. Also, since each of the pixels on the light valve displays red, green and blue sequentially, colors do not look separate unlike the above-described single-plate projection-type image display apparatus (see FIGS. 7 and 8). Therefore, it is possible to provide a high quality image.

However, in the above configuration, the light beams of these colors from the field stop 922 are not focused when transmitted by the rotating prism 924a. Since the size (the radius of gyration) of the rotating prism 924a has to be in accordance with a region illuminated by the light beam emitted from the field stop 922, the rotating prism 924a becomes large and heavy. This has made it difficult to reduce the size and weight of the apparatus.

Furthermore, a powerful motor for rotating the rotating prism 924a becomes necessary, causing an increase in the size and cost of the apparatus.

In addition, the single-plate projection-type image display apparatus and the three-plate projection-type image display apparatus are both placed on a desk or the like and used for a presentation or viewing movies. Accordingly, in order not to get in the way of viewing, most of them are thin horizontal types in which component parts are laid out horizontally so as to reduce its height, while vertical types in which component parts are laid out vertically are hardly seen.

SUMMARY OF THE INVENTION

It is an object of the present invention to solve the above-described problems of the conventional projection-type image display apparatus and to provide a projection-type image display apparatus that is provided with a scanning optical system for scanning an illuminated portion (a light valve) sequentially with light beams of individual colors, has a high efficiency of light utilization and component parts laid out horizontally, and is small and thin.

In order to achieve the above-mentioned object, the present invention has the following configurations.

A projection-type image display apparatus of the present invention includes a light source portion for emitting respective light beams of red, green and blue, a first optical system that the respective light beams from the light source portion enter, a rotating polygon mirror that the respective light beams having left the first optical system enter and that makes the respective light beams perform a scanning while reflecting the respective light beams, a second optical system for leading the respective light beams from the rotating polygon mirror to an illumination position, an image display panel that is arranged at the illumination position and provided with many pixels for modulating an incident light according to a color signal of red, green or blue, an image display panel driving circuit for driving each of the pixels of the image display panel by a signal corresponding to a color of light entering this pixel, and a projection optical system for magnifying and projecting an image of the image display panel. Belt-like regions illuminated by the respective light beams are formed substantially in parallel with each other on the image display panel and moved continuously by the scanning, thereby displaying a color image. The second optical system includes at least one lens and an optical element for rotating the respective light beams from the rotating polygon mirror substantially by 90° and directing them to the illumination position.

This makes it possible to display the color image using a light valve having neither a color filter nor a pixel exclusively for a light beam of each color, thereby achieving a higher efficiency of light utilization and a higher resolution display. Also, since the second optical system rotates the light beam from the rotating polygon mirror by 90° and leads it to the image display panel, it is possible to reduce the thickness of the apparatus in a direction of a rotation axis of the rotating polygon mirror. Thus, a small and thin image display apparatus can be achieved using a widely-used light valve.

In the projection-type image display apparatus described above, it is preferable that the optical element of the second optical system includes at least two total reflection mirrors arranged obliquely. This makes it possible to provide a small and thin projection-type image display apparatus with a simple configuration in a low cost manner.

Also, in the projection-type image display apparatus described above, the light source portion may include a light source for emitting a white light beam including red, green and blue light beams and a color separation optical system for separating the white light beam into the red, green and blue light beams. By using a white light source and obtaining the light beams of red, green and blue by the color separation optical system, the light from the light source can be utilized still more efficiently.

Furthermore, in the projection-type image display apparatus described above, it is preferable that the light source portion includes an integrator optical system. This makes it possible to ensure uniformity of illumination in a direction orthogonal to a scanning direction of the image display panel.

Moreover, in the projection-type image display apparatus described above, it is preferable that the lens of the second optical system includes at least one fθ lens. This makes it possible to move (scan) an illuminated region easily on the image display panel.

In addition, in the projection-type image display apparatus described above, the image display panel may be a transmission-type light valve. Alternatively, the image display panel may be a reflection-type light valve.

DESCRIPTION OF THE PREFERRED EMBODIMENTS

First Embodiment

Figure 1:
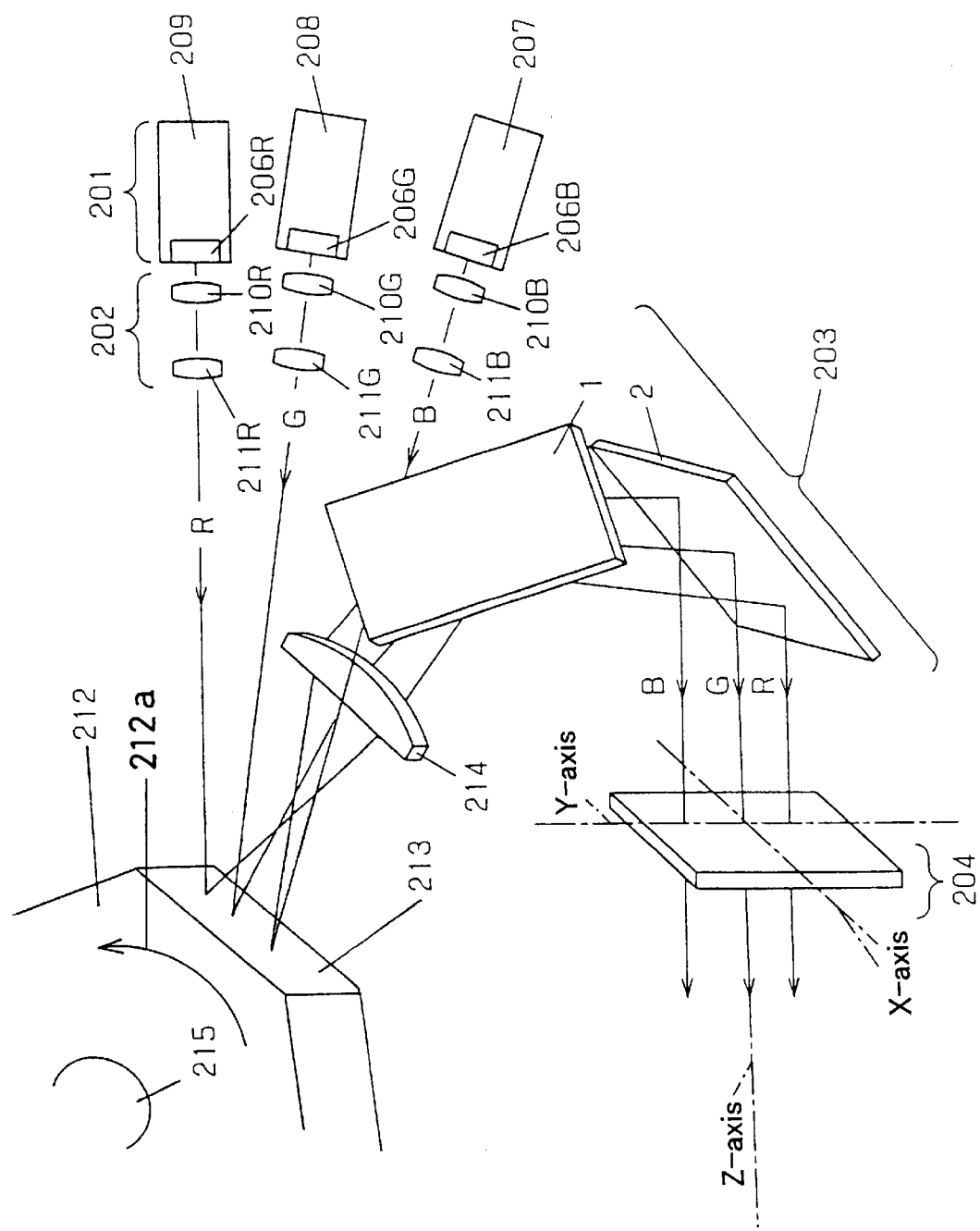
FIG. 1 is a conceptual view showing a configuration of an optical system of a projection-type image display apparatus of a first embodiment of the present invention.

FIG. 1 schematically shows a part of a projection-type image display apparatus of a first embodiment of the present invention. The projection-type image display apparatus of the first embodiment includes a light source portion 201, a focusing system (a first optical system) 202, a rotating polygon mirror 212, a scanning optical system (a second optical system) 203, an image display panel 204, an image display panel driving circuit (not shown in this figure) and a projection optical system (not shown in this figure).

The light source portion 201 has a light source portion for blue light 207, a light source portion for green light 208 and a light source portion for red light 209 that emit blue, green and red light beams respectively. The light source portion for blue light 207, the light source portion for green light 208 and the light source portion for red light 209 respectively are provided with rectangular light emitting portions 206B, 206G and 206R on their light emitting side. The light beams of respective colors emitted from the light emitting portions 206R, 206G and 206B enter first focusing lenses 210R, 210G and 210B provided for the respective colors in the focusing system 202. The light beams of these colors leave the first focusing lenses 210R, 210G and 210B, pass through second focusing lenses 211R, 211G and 211B provided for the respective colors, and enter a reflecting surface 213 on a periphery of the rotating polygon mirror 212 at different angles from each other. These light beams reflected by the rotating polygon mirror 212 enter the scanning optical system 203 at different angles from each other, travel via a scanning lens 214, a first reflecting mirror 1 and a second reflecting mirror 2 in the scanning optical system 203 sequentially, and then reach different positions in the image display panel 204.

Figure 2:
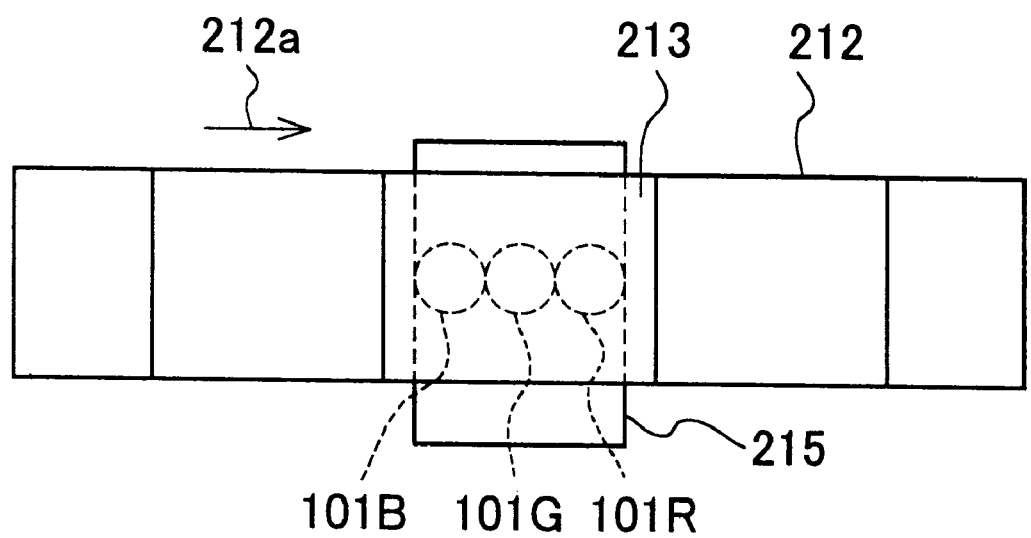
FIG. 2 is a side view showing how groups of red, green and blue lights are formed on a rotating polygon mirror of the projection-type image display apparatus shown in FIG. 1.

FIG. 2 shows one moment during the rotation of the rotating polygon mirror 212. As shown in this figure, groups (spots) of red, green and blue lights 101R, 101G and 101B are formed on one reflecting surface 213 so as to be aligned along the rotation direction 212a such that their chief rays are not overlapped.

The rotating polygon mirror 212 is rotated in the rotation direction 212a within a horizontal plane about a rotation axis 215 by a motor (not shown in this figure).

In the projection-type image display apparatus of the present invention, for the purpose of achieving a thin horizontal type apparatus in which component parts are laid out horizontally so as to reduce its height, the rotation axis of the rotating polygon mirror 212 is set in a substantially vertical direction as described above so that the rotating polygon mirror 212 is rotated within the horizontal plane. However, when the rotating polygon mirror 212 is rotated within the horizontal plane and the optical system is laid out horizontally, the light beams of the individual colors reflected by the rotating polygon mirror 212 are scanned within the horizontal plane. Thus, in this case, the light beams of red, green and blue move horizontally (in the longer side direction) from right to left or from left to right on the image display panel 204. Consequently, in order to drive each pixel of the image display panel 204 by a signal of the corresponding color of the light beams that enters this pixel, it is necessary to scan the image display panel 204 vertically (in the shorter side direction).

However, regular liquid crystal display panels used widely are designed to be scanned horizontally (in the longer side direction). Accordingly, when such widely-used liquid crystal display panels are driven by changing their scanning direction to be the vertical direction, the following problems are caused.

In order to obtain a video signal of one vertical line from video signals inputted sequentially in the horizontal direction, a frame memory of at least one frame and a circuit for rotating a scanning axis by 90° become necessary, leading to a considerable cost increase. Also, since a gate line has low frequency characteristics and is not suitable for high-speed processing, it is impossible in terms of circuit that a gate driver finishes writing one line and writes video data of one dot into all the gate lines within a horizontal synchronization period (1 H period). On the other hand, although a source driver is capable of high-speed processing, it cannot be utilized.

Therefore, it is necessary to newly design a special image display panel for changing the scanning direction to be the vertical direction, or to change a moving direction of the light beams entering the image display panel 204 to be the vertical direction. However, in the former case, inexpensive liquid crystal panels that are used widely cannot be used anymore, leading to an increase in the apparatus cost.

Accordingly, the present invention has achieved a configuration in which the light beams of red, blue and green move vertically on the image display panel 204. More specifically, in order to realize this configuration, the scanning optical system 203 is configured as follows. The first reflecting mirror 1 and the second reflecting mirror 2 are used as the scanning optical system 203. The first reflecting mirror 1 is inclined by 25° around X-axis, by −40° around Y-axis (a vertical axis) and by 47° around Z-axis (an axis in a normal direction of the image display panel 204). The second reflecting mirror 2 is inclined by −35° around X-axis and by −50° around Y-axis. Furthermore, in order to adjust the magnification ratio between the spot image formed on the reflecting surface 213 of the rotating polygon mirror 212 and that formed on the image display panel 204, the scanning lens 214 serving as a fθ lens is provided.

Figure 3:
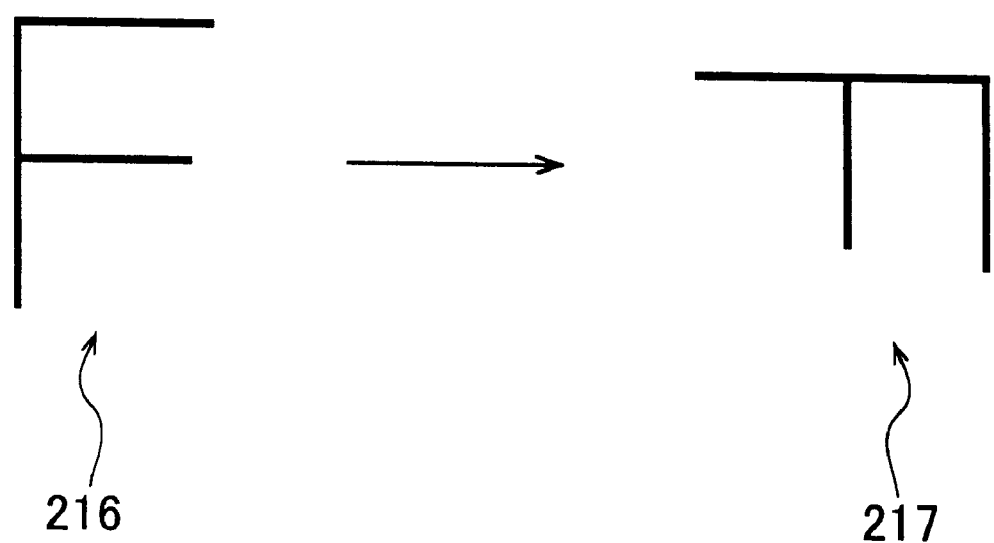
FIG. 3 is a conceptual view showing how a spot image is rotated by a second optical system in the projection-type image display apparatus shown in FIG. 1.
Figure 4:
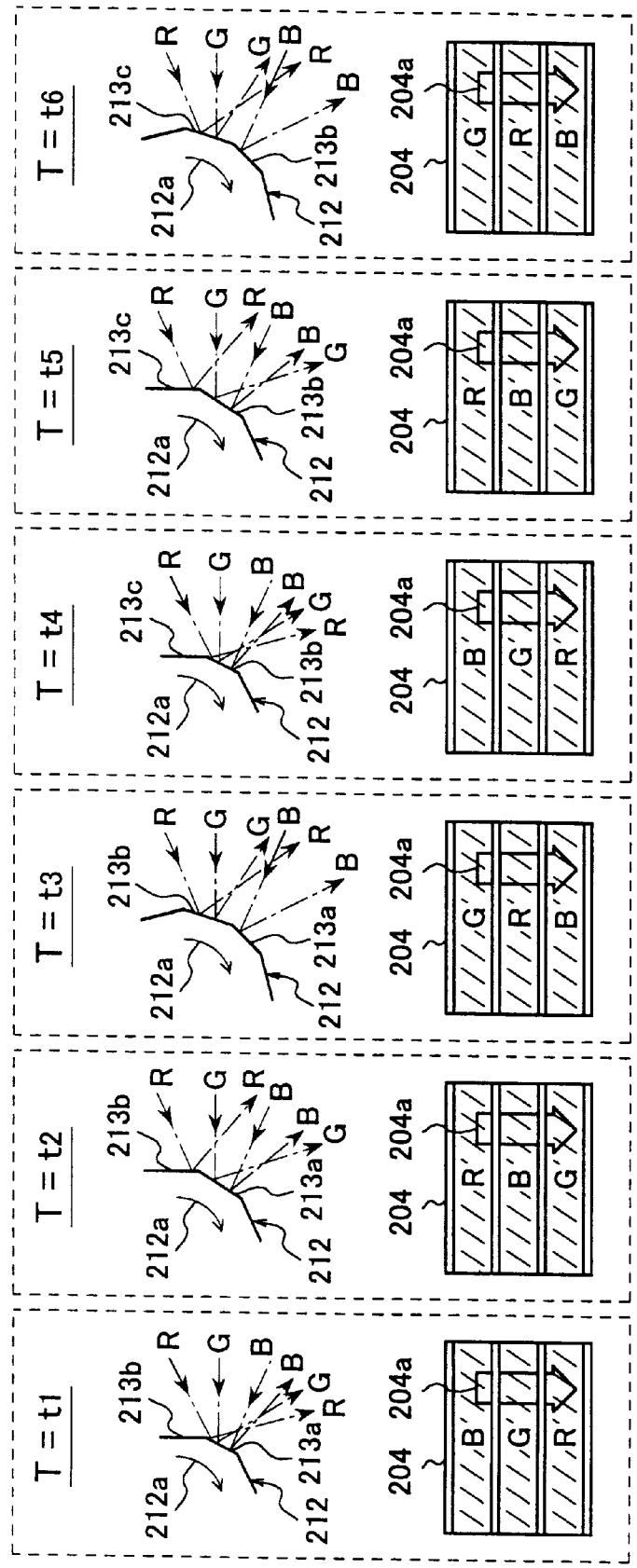
FIGS. 4A to 4F are drawings showing how light reflected by the rotating polygon mirror changes and how light beams of individual colors illuminating an image display panel are scanned in the projection-type image display apparatus shown in FIG. 1.

With the first reflecting mirror 1, the second reflecting mirror 2 and the scanning lens 214 described above, the spot image formed on the reflecting surface 213 of the rotating polygon mirror 212 is formed on the image display panel 204 as a spot image that has an adjusted magnification and is rotated substantially by 90°. In other words, as in the conceptual view of the spot images to be illuminated shown in FIG. 3, a spot image 216 on the reflecting surface 213 of the rotating polygon mirror is rotated substantially by 90° as indicated by a spot image 217 on the image display panel 204 by the effect of the first reflecting mirror 1 and the second reflecting mirror 2 described above.

In the present invention, as long as the spot image on the reflecting surface 213 of the rotating polygon mirror 212 is rotated substantially by 90° on the image display panel 204, the angles of inclination of the first reflecting mirror 1 and the second reflecting mirror 2 are not limited to those in the above configuration and can be changed suitably according to a set layout. Also, three or more reflecting mirrors may be combined. Alternatively, instead of the combination of the reflecting mirrors, other members such as a prism may be used to achieve a similar effect. In addition, although only one scanning lens 214 is used in the above example, two or more lenses may be used for correcting aberration. The surface shape of the scanning lens also is not specifically limited.

Next, when the rotating polygon mirror 212 is rotated, how a reflected light changes in the reflecting surface 213 and how the light beams of individual colors illuminating the image display panel 204 are scanned will be described by way of FIGS. 4A to 4F.

FIGS. 4A to 4F show the rotation of the rotating polygon mirror 212 and an accompanying change of a state of the image display panel 204 illuminated by the light beams of individual colors at a fixed time interval. In the figures showing the rotation of the rotating polygon mirror 212 and reflection states of the light beams of individual colors located above, R, G and B indicate chief rays of red light, green light and blue light respectively, and arrows indicate the traveling directions of these rays. In the figures showing the illumination states of the image display panel 204 located below, R, G and B indicate regions illuminated by the red light, the green light and the blue light respectively.

At time T=t1 (see FIG. 4A), the light beams of red, green and blue enter the same reflecting surface 213a of the rotating polygon mirror 212. As shown in the figure, the red light beam is reflected at the largest angle toward the rotation direction 212a, the green light beam is reflected at a slightly smaller angle than the red light beam, and the blue light beam is reflected at a still smaller angle than the green light beam. Thus, the light beams of these colors enter the scanning lens 214 in the scanning optical system 203 at different angles from each other. In the scanning optical system 203, a height of a light beam at an illumination position (the image display panel 204) is determined depending on the incident angle of the light beam. Therefore, the light beams of the respective colors form images of the first focusing lenses 210R, 210G and 210B provided for the respective colors at different positions on the image display panel 204 as indicated by the figure. In other words, the region illuminated by the blue light, the region illuminated by the green light and the region illuminated by the red light are formed on the image display panel 204 in this order from the top.

At time T=t2 (see FIG. 4B), which is the time the rotating polygon mirror 212 has been rotated by a predetermined angle from the position at time T=t1, the green light beam and the blue light beam enter the same reflecting surface 213a of the rotating polygon mirror 212, while the red light beam enters a reflecting surface 213b that has just arrived at this entering position. At this time, in particular, since the incident angle of the red light beam into the reflecting surface 213*b* is small, its reflection angle toward the rotation direction 212*a* is the smallest among the three light beams. Accordingly, the green light beam is reflected at the largest angle toward the rotation direction 212*a*, the blue light beam is reflected at a slightly smaller angle than the green light beam, and the red light beam is reflected at a still smaller angle than the blue light beam. Therefore, the light beams of the respective colors form images of the first focusing lenses 210R, 210G and 210B provided for the respective colors at different positions on the image display panel 204 as indicated by the figure. In other words, the region illuminated by the red light, the region illuminated by the blue light and the region illuminated by the green light are formed on the image display panel 204 in this order from the top.

At time T=t3 (see FIG. 4C), which is the time the rotating polygon mirror 212 has been further rotated by a predetermined angle from the position at time T=t2, only the blue light beam enters the reflecting surface 213*a*, while the green light beam and the red light beam enter the same reflecting surface 213*b*. At this time, in particular, since the incident angle of the green light beam into the reflecting surface 213*b* is small, the reflection angle toward the rotation direction 212*a* is the smallest among the three light beams. Accordingly, the blue light beam is reflected at the largest angle toward the rotation direction 212*a*, the red light beam is reflected at a slightly smaller angle than the blue light beam, and the green light beam is reflected at a still smaller angle than the red light beam. Therefore, the light beams of the respective colors form images of the first focusing lenses 210R, 210G and 210B provided for the respective colors at different positions on the image display panel 204 as indicated by the figure. In other words, the region illuminated by the green light, the region illuminated by the red light and the region illuminated by the blue light are formed on the image display panel 204 in this order from the top.

At time T=t4 (see FIG. 4D), which is the time the rotating polygon mirror 212 has been further rotated by a predetermined angle from the position at time T=t3, the light beams of red, green and blue enter the same reflecting surface 213*b*. At this time, the positional relationship is the same as that at time T=t1 (see FIG. 4A), and the state of the image display panel 204 illuminated by the light beams of these colors also is the same.

At time T=t5 (see FIG. 4E), which is the time the rotating polygon mirror 212 has been further rotated by a predetermined angle, the green light beam and the blue light beam enter the same reflecting surface 213*b*, while the red light beam enters a reflecting surface 213*c* that has just arrived at this entering position. At this time, the positional relationship is the same as that at time T=t2 (see FIG. 4B), and the state of the image display panel 204 illuminated by the light beams of these colors also is the same.

At time T=t6 (see FIG. 4F), which is the time the rotating polygon mirror 212 has been further rotated by a predetermined angle, the blue light beam enters the reflecting surface 213*b*, while the green light beam and the red light beam enter the same reflecting surface 213*c*. At this time, the positional relationship is the same as that at time T=t3 (see FIG. 4C), and the state of the image display panel 204 illuminated by the light beams of these colors also is the same.

As described above, the belt-like regions illuminated by the light beams of red, green and blue that are formed on the image display panel 204 move sequentially in a scanning direction 204*a*. Although FIGS. 4A to 4F showed only the specific period (time T=t1 to t6) in the above description, because of a continuous rotation of the rotating polygon mirror 212, each of the regions illuminated by the light beams of the individual colors moves (is scanned) on the image display panel 204 continuously downward (in the scanning direction 204*a*). When the region illuminated by the light beam reaches the lower end, it returns to the upper end and moves downward again. A continuous switching of the times t1 to t6 described above at an even time interval allows an illumination with enhanced color uniformity and brightness uniformity and reduced flicker.

The scanning optical system 203 is formed of an optical system provided with a function of the fθ lens and that of changing the magnification for forming an appropriate illuminated region on the image display panel 204. In the above configuration, the images of the first focusing lenses 210R, 210G and 210B provided for the respective colors are formed at the illumination position. At least in the scanning direction 204*a*, the images of the first focusing lenses 210R, 210G and 210B provided for the respective colors and the belt-like illuminated regions (color bands) at the illumination position are conjugated.

Figure 5:
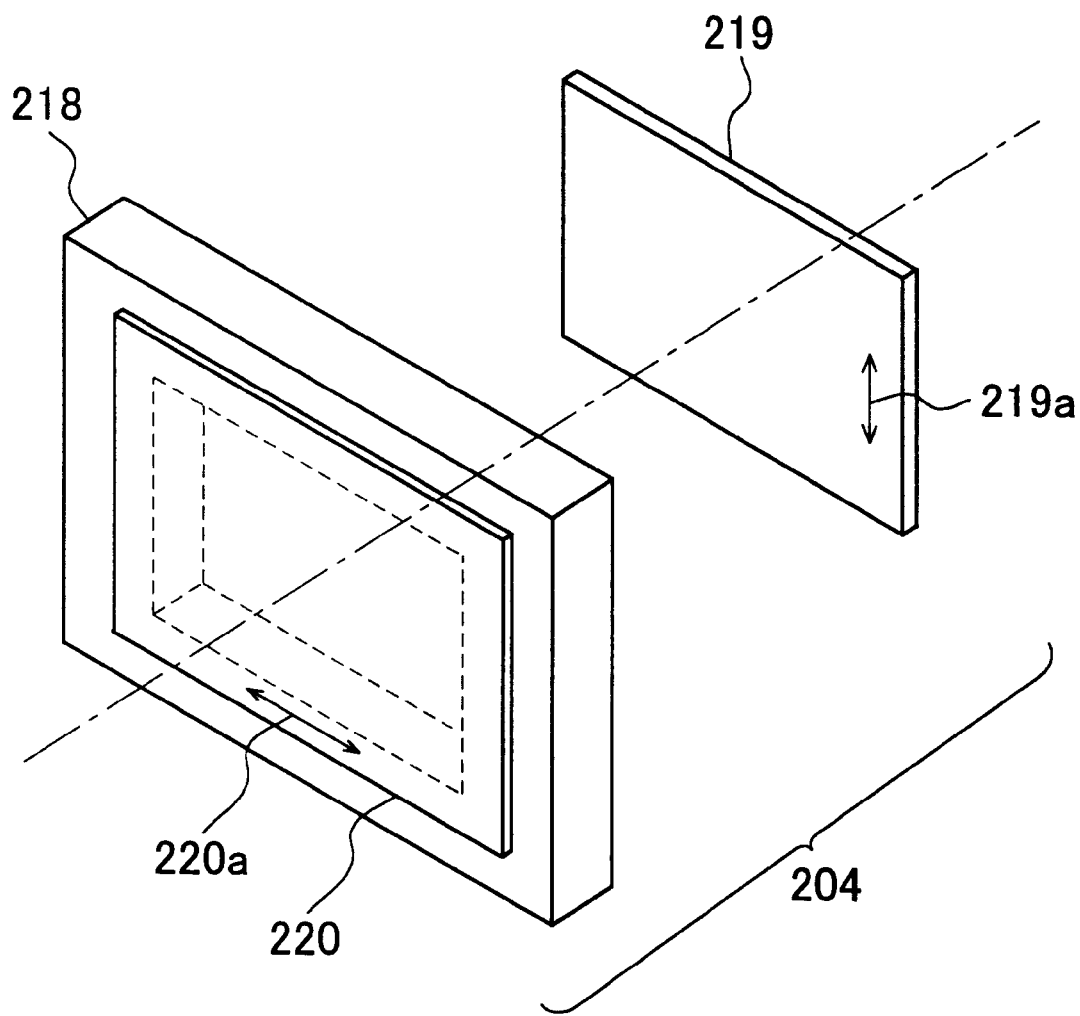
FIG. 5 is an exploded perspective view showing a configuration of a transmission-type image display panel used in the projection-type image display apparatus shown in FIG. 1.

As shown in FIG. 5, the image display panel 204 includes a transmission-type liquid crystal panel 218, an entrance-side polarizing plate 219 as a polarizer provided on the entrance-side and an exit-side polarizing plate 220 as an analyzer provided on the exit side. The entrance-side polarizing plate 219 is designed, for example, to transmit light polarized in a shorter side direction 219*a* of its rectangular outline and to absorb light polarized in a direction orthogonal thereto. The light transmitted by the entrance-side polarizing plate 219 enters the liquid crystal panel 218. The liquid crystal panel 218 has many pixels formed and arranged therein and is capable of changing the polarization direction of the transmitted light at every pixel aperture by an external signal. In this configuration, the liquid crystal panel 218 transmits the incident light while rotating its polarization direction by 90° when the pixels are not driven, whereas it transmits the incident light without changing the polarization direction when the pixels are driven. The exit-side polarizing plate 220 has polarization characteristics in a direction orthogonal to the entrance-side polarizing plate 219. In other words, the exit-side polarizing plate 220 has a transmission axis in a longer side direction 220*a* of its rectangular outline and transmits light polarized in this direction. Thus, the light that has entered an undriven pixel of the liquid crystal panel 218 and been transmitted with its polarization direction rotated by 90° can pass through this exit-side polarizing plate 220 because it is polarized in a direction parallel to the transmission axis of the exit-side polarizing plate 220. On the other hand, the light that has entered a driven pixel of the liquid crystal panel 218 and been transmitted without being subjected to the change in its polarization direction is absorbed by this exit-side polarizing plate 220 because it is polarized in a direction orthogonal to the transmission axis of the exit-side polarizing plate 220.

With the use of the image display panel 204 configured as above, an image is formed by driving each pixel of the liquid crystal panel 218 by a signal corresponding to the color of illuminating light so as to modulate the light at every pixel. The light transmitted by the image display panel 204 is magnified and projected onto a screen (not shown in this figure) via a projection lens (not shown either). Since the scannings of the light beams of the individual colors shown in FIGS. 4A to 4F are carried out at a high speed (it is preferable that one unit consisting of FIGS. 4A to 4F is carried out at least once within one field period), images of individual colors are synthesized so that the image on the screen is perceived by a retina of an observer as a color image that does not look separate.

As described above, the light beams of individual colors enter the rotating polygon mirror rotating within the horizontal plane at different incident angles, and then the image on the rotating polygon mirror is rotated by about 90° so as to be formed on the image display panel. This makes it possible to display a color image even when using an image display panel that is not provided with a color selection member such as a color filter. In addition, since each pixel of the image display panel 204 displays the image according to the color of light illuminating this pixel, resolution is not deteriorated. Furthermore, since the light from the light source portion 201 always is led to the image display panel 204 effectively, it is possible to achieve a high efficiency of light utilization.

Also, by focusing the light beam on the reflecting surface 213 of the rotating polygon mirror 212 so as to obtain smaller spot images 101R, 101G and 101B, the reflecting surface 213 can be made smaller. Accordingly, it becomes possible to reduce the size of the rotating polygon mirror 212, allowing a smaller motor for rotating this rotating polygon mirror. As a result, it becomes possible to reduce the size, weight and cost of the entire apparatus.

Although a transmission-type liquid crystal system display device was used as the image display panel 204 in the above embodiment, any device is appropriate as long as it is a display device that displays an image by modulating an incident light. Thus, it is possible to use a reflection-type liquid crystal system or a reflection-type mirror device. Needless to say, it has to be a display device capable of fast response.

Second Embodiment

Figure 6:
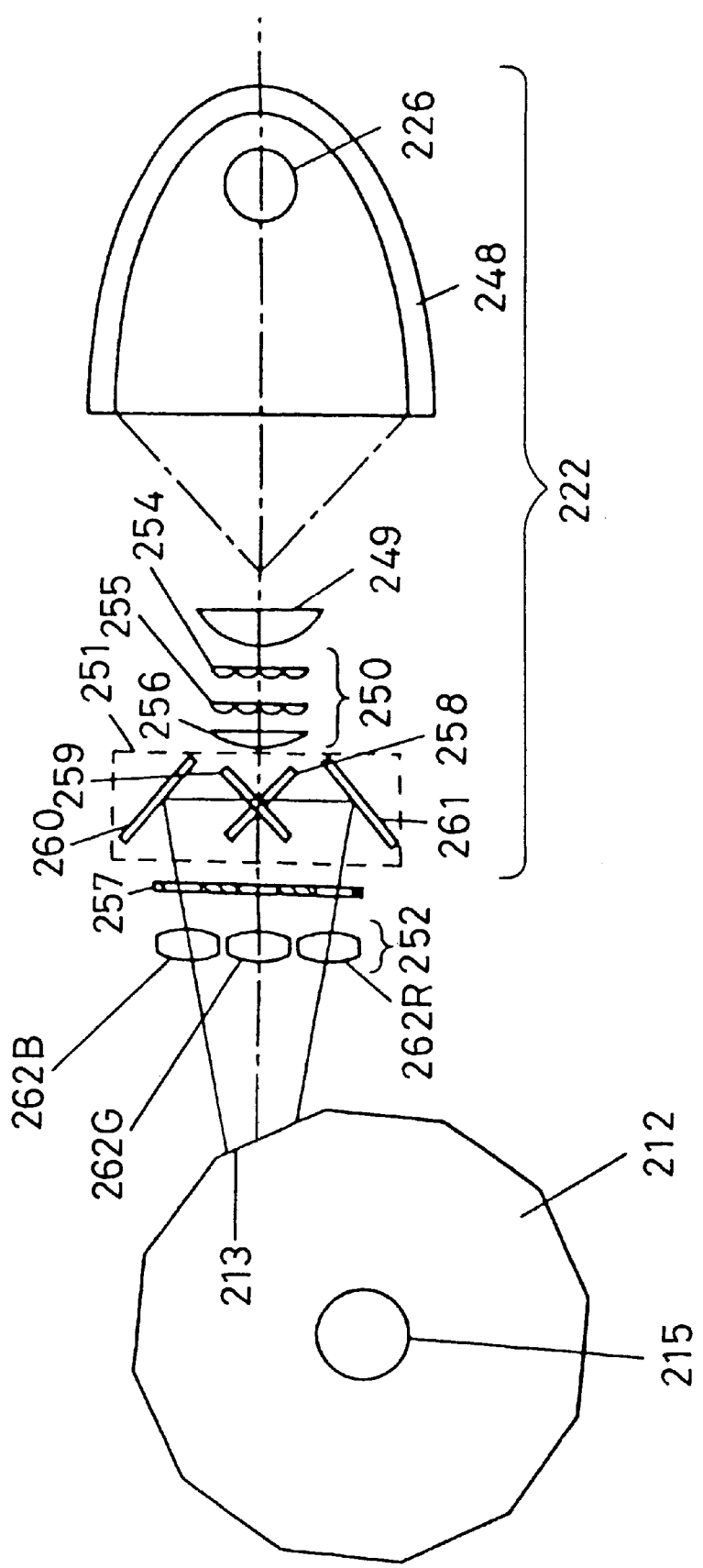
FIG. 6 is a conceptual view showing a part of a configuration of an optical system of a projection-type image display apparatus of a second embodiment of the present invention.
Figure 7:
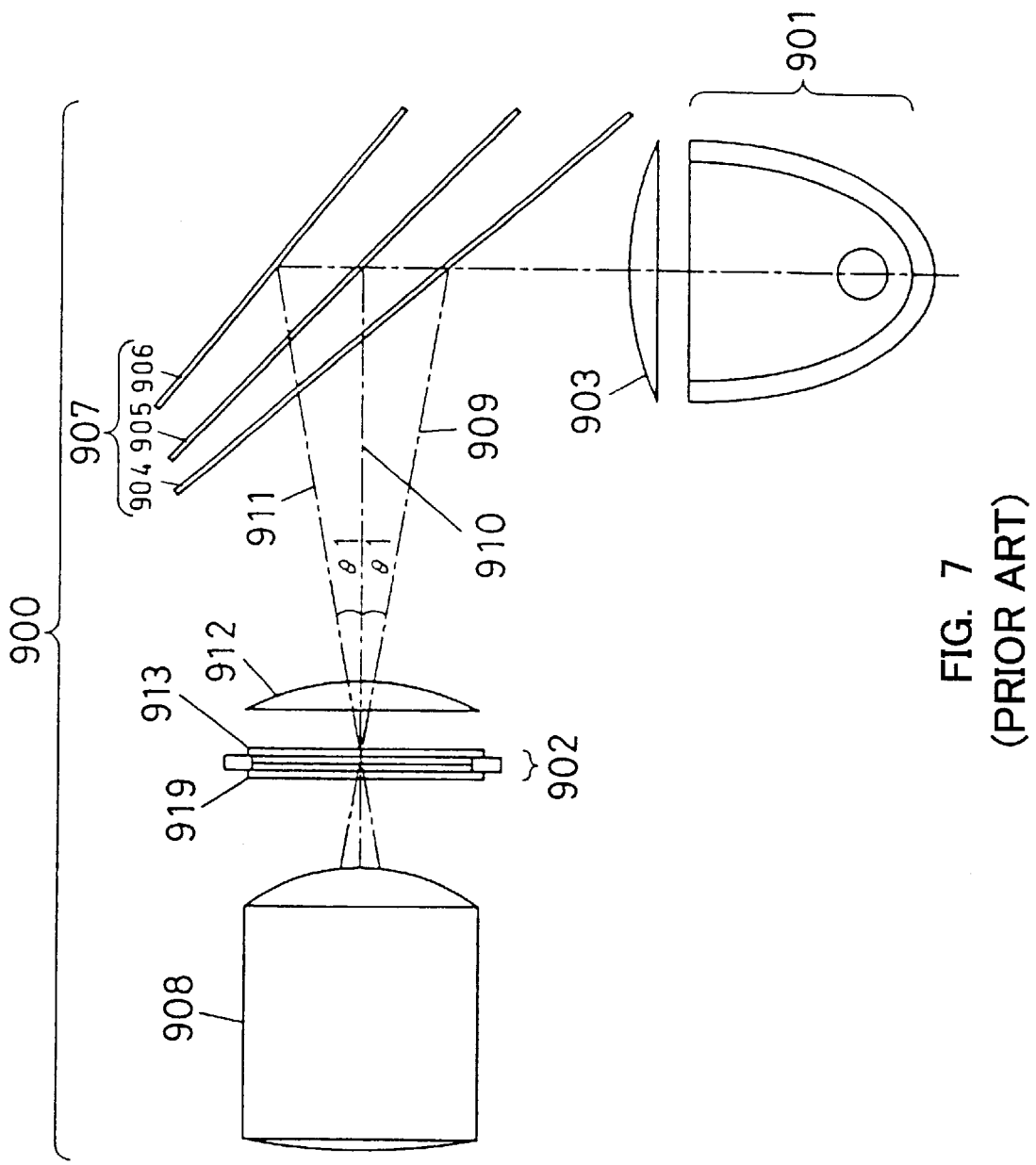
FIG. 7 is a schematic view showing a configuration of a conventional single-plate projection-type image display apparatus using dichroic mirrors and a microlens array.
Figure 8:
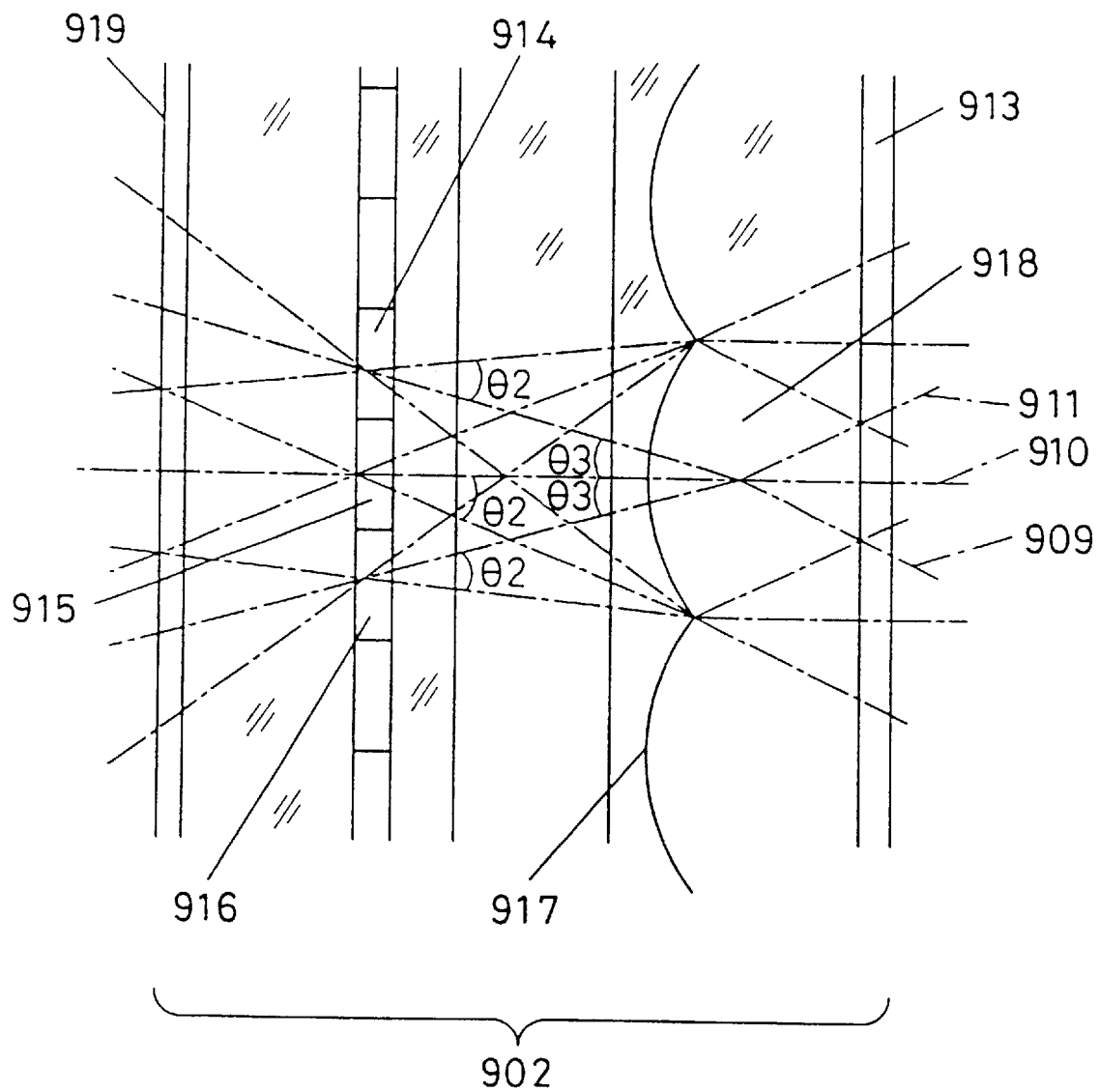
FIG. 8 is a sectional view showing a detail of a light valve used in the image display apparatus shown in FIG. 7.
Figure 9:
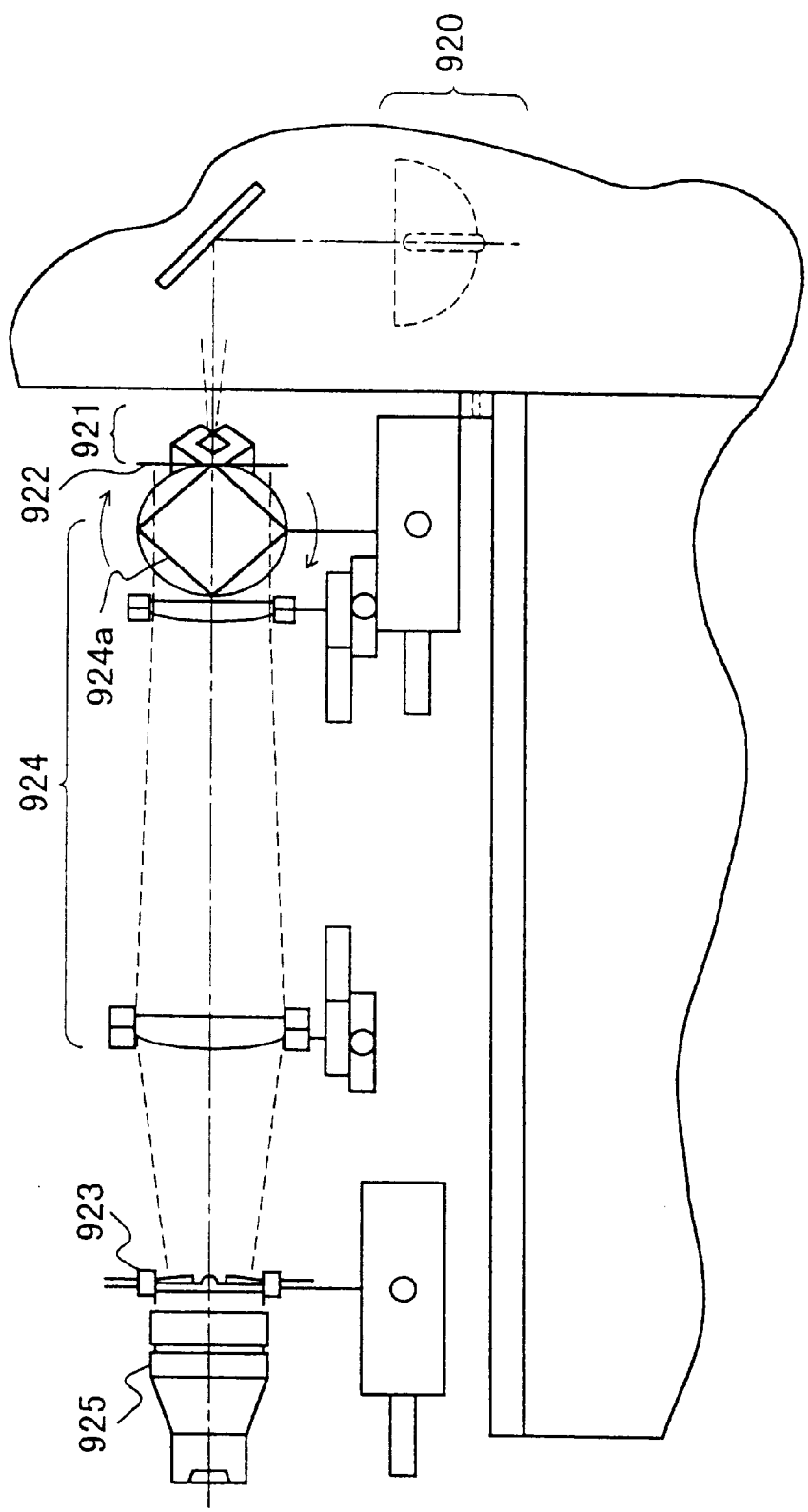
FIG. 9 is a schematic view showing a configuration of a conventional single-plate projection-type image display apparatus using a scanning optical system.
Figure 10:
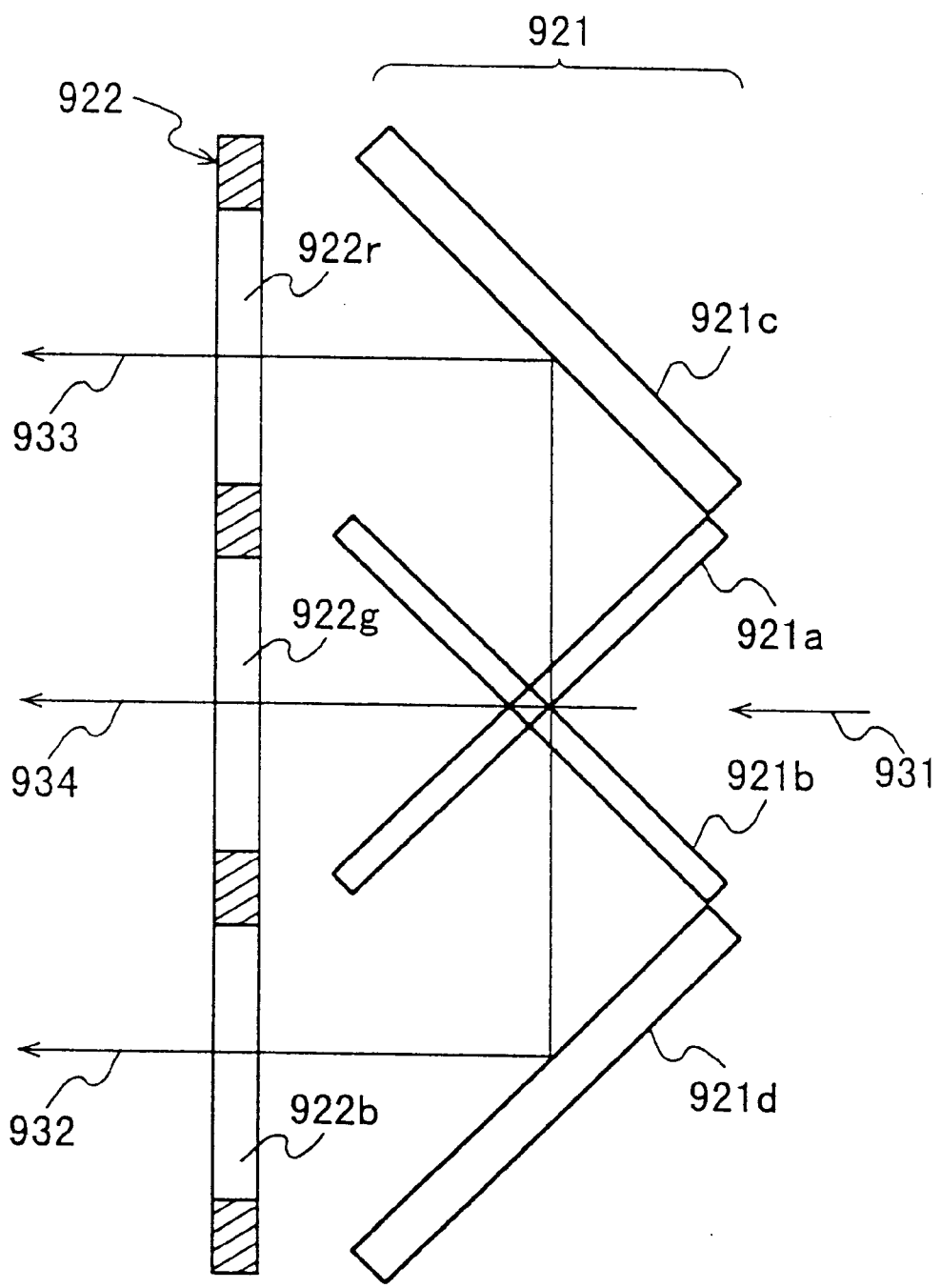
FIG. 10 is a sectional view showing a detail of a color separation optical system used in the image display apparatus shown in FIG. 9.

FIG. 6 is a plan view showing a schematic configuration of a projection-type image display apparatus from a light source portion to a rotating polygon mirror in accordance with a second embodiment of the present invention. The projection-type image display apparatus of the second embodiment includes a light source portion 222, a focusing optical system (a first optical system) 252 for light beams of different colors and a rotating polygon mirror 212. The projection-type image display apparatus of the second embodiment further includes a scanning optical system (a second optical system), an image display panel, an image display panel driving circuit and a projection optical system, which are not shown in this figure because they have substantially the same configuration as that in the first embodiment.

The light source portion 222 is provided with a light source 226 for forming an arc by a discharge between electrodes, generating a white light beam and emitting it and a reflector 248 having an elliptical reflecting surface. The reflector 248 focuses the light beam from the light source 226 onto one point ahead on an opening side on an axis of rotational symmetry of the reflecting surface (a focal position).

The light source portion 222 further includes a collimator optical system 249, an integrator optical system 250 and a color separation optical system 251.

The collimator optical system 249 includes a collimator lens for turning the light beam focused by the reflector 248 into a substantially parallel light beam. In other words, the collimator lens has a focal length that is equivalent to the distance to the focusing position.

The parallel light beam that has passed through the collimator optical system 249 enters the integrator optical system 250. The integrator optical system 250 includes a first microlens array 254, which is a group of identically-shaped microlenses, a second lens array 255 that has the same shape as the first lens array 254, and a focusing lens 256. The integrator optical system 250 superimposes an image of the microlens on the first lens array onto a stop 257, allowing a uniform illumination.

The white light beam from the integrator optical system 250 enters the color separation optical system 251 before reaching the stop 257. The color separation optical system 251 includes a blue-reflecting dichroic mirror 258 and a red-reflecting dichroic mirror 259 that are arranged obliquely with respect to the incident light and crossed each other and total reflection mirrors 260 and 261 that are arranged obliquely with respect to the incident light. The white light beam that has entered the color separation optical system 251 is separated into blue, green and red light beams as shown in FIG. 6. These light beams enter apertures of corresponding colors on the stop 257 at different angles, and then reach the focusing optical system 252 for light beams of respective colors.

The focusing optical system 252 for light beams of respective colors includes a blue light focusing lens 262B, a green light focusing lens 262G and a red light focusing lens 262R. These focusing lenses 262B, 262G and 262R are decentered appropriately with respect to the apertures on the stop 257. Thus, the light beams of the respective colors emitted from the focusing lenses 262B, 262G and 262R enter a reflecting surface 213 of the rotating polygon mirror 212 at desired incident angles.

These light beams reflected by the rotating polygon mirror 212 travel via a scanning optical system (the second optical system) 203, an image display panel 204 and the projection optical system, which are configured as in the first embodiment (see FIG. 1), and are magnified and projected onto a screen. The description thereof will be the same as that in the first embodiment and therefore omitted here.

According to the second embodiment, even when using a discharge-tube-type light source such as a metal halide lamp or a high-pressure mercury-vapor lamp emitting white light, a color image can be displayed using an image display panel that is not provided with a color selection member such as a color filter. In addition, since each pixel of the image display panel displays the image according to the color of light illuminating this pixel, resolution is not deteriorated. Furthermore, since the light from the light source 226 always is led to the image display panel effectively, it is possible to achieve a high efficiency of light utilization.

Moreover, in the case where the discharge-tube-type light source is used, a light beam having a distribution in which the center is bright and the periphery is dark is emitted from the reflector 248. Therefore, when such a light source is used, the periphery becomes darker than the center in the direction orthogonal to the scanning direction of the image display panel. In the present embodiment, on the other hand, an image having uniform brightness is formed using the integrator optical system 250 and then projected, so it is possible to produce an excellent image without any brightness decrease in the periphery even in the direction orthogonal to the scanning direction of the image display panel.

In the second embodiment, it should be clear that, when the white light beam is separated, the arrangement of colors can be changed by changing the configuration of the color separation optical system 251. Also, it is needless to say that the color separation optical system 251 can be configured otherwise as long as it can separate an optical path of the white light into optical paths of individual colors.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A projection-type image display apparatus comprising:
    a light source portion for emitting respective light beams of red, green and blue;
    a first optical system that the respective light beams from the light source portion enter;
    a rotating polygon mirror that the respective light beams having left the first optical system enter and that makes the respective light beams perform a scanning while reflecting the respective light beams;
    a second optical system for leading the respective light beams from the rotating polygon mirror to an illumination position;
    an image display panel that is arranged at the illumination position and provided with many pixels for modulating an incident light according to a color signal of red, green or blue;
    an image display panel driving circuit for driving each of the pixels of the image display panel by a signal corresponding to a color of light entering this pixel; and
    a projection optical system for magnifying and projecting an image of the image display panel;
    wherein belt-like regions illuminated by the respective light beams are formed substantially in parallel with each other on the image display panel and moved continuously by the scanning, thereby displaying a color image, and
    the second optical system comprises at least one lens and an optical element for rotating the respective light beams from the rotating polygon mirror substantially by 90° and directing them to the illumination position.

2. The projection-type image display apparatus according to claim 1, wherein the optical element of the second optical system comprises at least two total reflection mirrors arranged obliquely.

3. The projection-type image display apparatus according to claim 1, wherein the light source portion comprises a light source for emitting a white light beam including red, green and blue light beams and a color separation optical system for separating the white light beam into the red, green and blue light beams.

4. The projection-type image display apparatus according to claim 1, wherein the light source portion comprises an integrator optical system.

5. The projection-type image display apparatus according to claim 1, wherein the lens of the second optical system comprises at least one fθ lens.

6. The projection-type image display apparatus according to claim 1, wherein the image display panel is a transmission-type light valve.

7. The projection-type image display apparatus according to claim 1, wherein the image display panel is a reflection-type light valve.

* * * * *